United States Patent
Saint-Macary

(10) Patent No.: US 11,888,385 B2
(45) Date of Patent: Jan. 30, 2024

(54) VOLTAGE CONVERTER WITH CHARGE BALANCE BETWEEN MULTIPLE OUTPUTS

(71) Applicants: Continental Automotive France, Toulouse (FR); Continental Automotive GmbH, Hannover (DE)

(72) Inventor: Stéphane Saint-Macary, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 392 days.

(21) Appl. No.: 17/292,060

(22) PCT Filed: Dec. 6, 2019

(86) PCT No.: PCT/EP2019/084019
§ 371 (c)(1),
(2) Date: May 7, 2021

(87) PCT Pub. No.: WO2020/115293
PCT Pub. Date: Jun. 11, 2020

(65) Prior Publication Data
US 2021/0399631 A1    Dec. 23, 2021

(30) Foreign Application Priority Data
Dec. 6, 2018    (FR) ...................................... 1872442

(51) Int. Cl.
*H02M 3/07*    (2006.01)
*H02M 1/00*    (2006.01)

(52) U.S. Cl.
CPC ........... *H02M 1/007* (2021.05); *H02M 1/008* (2021.05); *H02M 3/07* (2013.01)

(58) Field of Classification Search
CPC .............................. H02M 1/007; H02M 1/008
See application file for complete search history.

(56) References Cited

U.S. PATENT DOCUMENTS

| | | | |
|---|---|---|---|
| 10,362,645 B1 * | 7/2019 | Ke | ........................ H02M 3/158 |
| 2003/0071602 A1 | 4/2003 | Ando | |

(Continued)

FOREIGN PATENT DOCUMENTS

| | | |
|---|---|---|
| CN | 103583081 A | 2/2014 |
| CN | 107786084 A | 3/2018 |

OTHER PUBLICATIONS

Wang, W., et al., "Analysis of fly-buck converter with emphasis on its cross-regulation," Mar. 10, 2017, vol. 10(3), 11 pages, XP006060211, IET Power Electronics, UK, The Institution of Engineering and Technology 2016.

(Continued)

*Primary Examiner* — Alex Torres-Rivera
(74) *Attorney, Agent, or Firm* — RatnerPrestia

(57) ABSTRACT

A voltage converter that receives at input a primary DC voltage that is variable over a wide voltage range and that supplies at output a regulated first secondary DC voltage and an unregulated second secondary DC voltage, including a buck converter with inductors coupled to two outputs, it also includes a boost converter arranged upstream of the buck converter and able to boost the primary voltage when activated, and a charge pump module arranged between the second secondary voltage and the first secondary voltage and able to balance the charges when activated, the boost converter and the charge pump module being activated simultaneously.

8 Claims, 2 Drawing Sheets

(56) References Cited

U.S. PATENT DOCUMENTS

| | | | |
|---|---|---|---|
| 2008/0157732 A1* | 7/2008 | Williams | H02M 3/1588 323/266 |
| 2013/0234513 A1* | 9/2013 | Bayer | H02M 3/07 307/31 |
| 2014/0070612 A1 | 3/2014 | Stöger | |
| 2016/0329815 A1 | 11/2016 | Massolini et al. | |
| 2018/0034374 A1* | 2/2018 | Breen | H02M 3/158 |
| 2019/0280590 A1* | 9/2019 | Lee | H02M 3/07 |

OTHER PUBLICATIONS

International Search Report and Written Opinion for International Application No. PCT/EP2019/084019, dated Feb. 27, 2020, with partial English translation, 8 pages.

International Search Report and Written Opinion for International Application No. PCT/EP2019/084019, dated Feb. 27, 2020, 14 pages (French).

English Translation of the Written Opinion for International Application No. PCT/EP2019/084019, dated Feb. 27, 2020, 6 pages.

Chinese Office Action for Chinese Application No. 201980080483.1, dated Jul. 12, 2023 with translation, 10 pages.

* cited by examiner

[Fig.1]
PRIOR ART
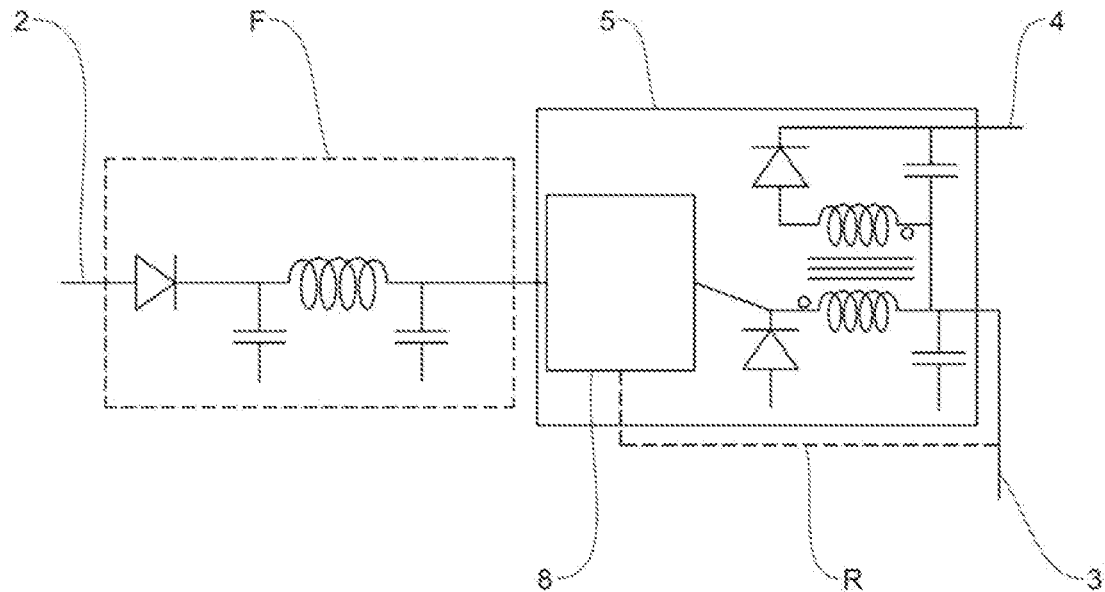
[Fig.2]
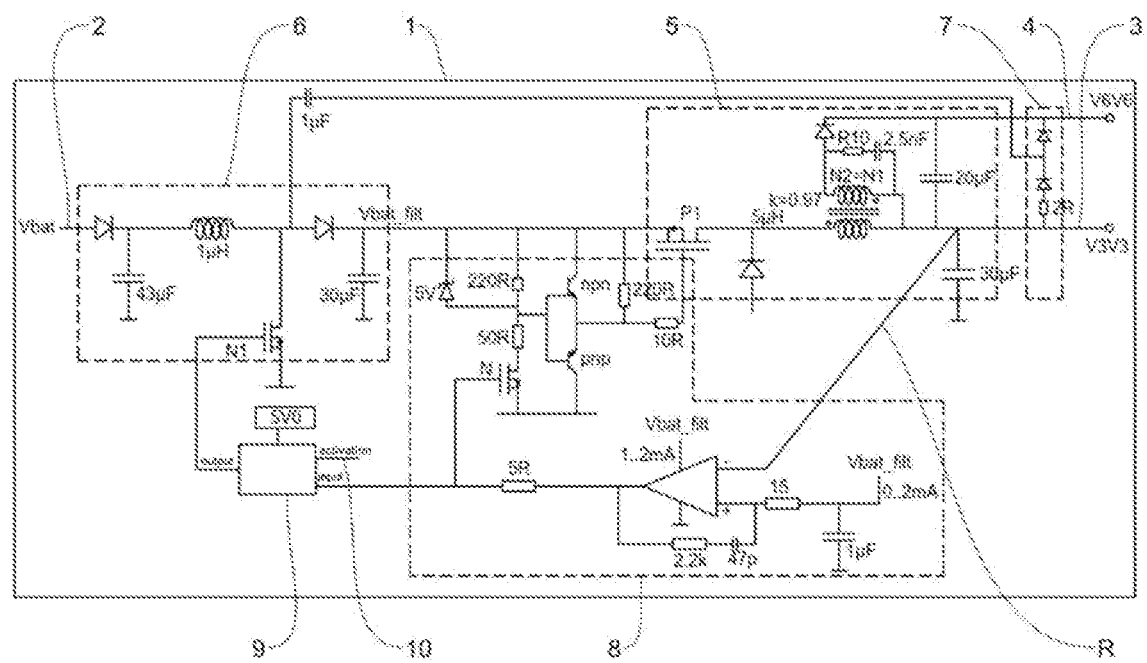

[Fig.3]
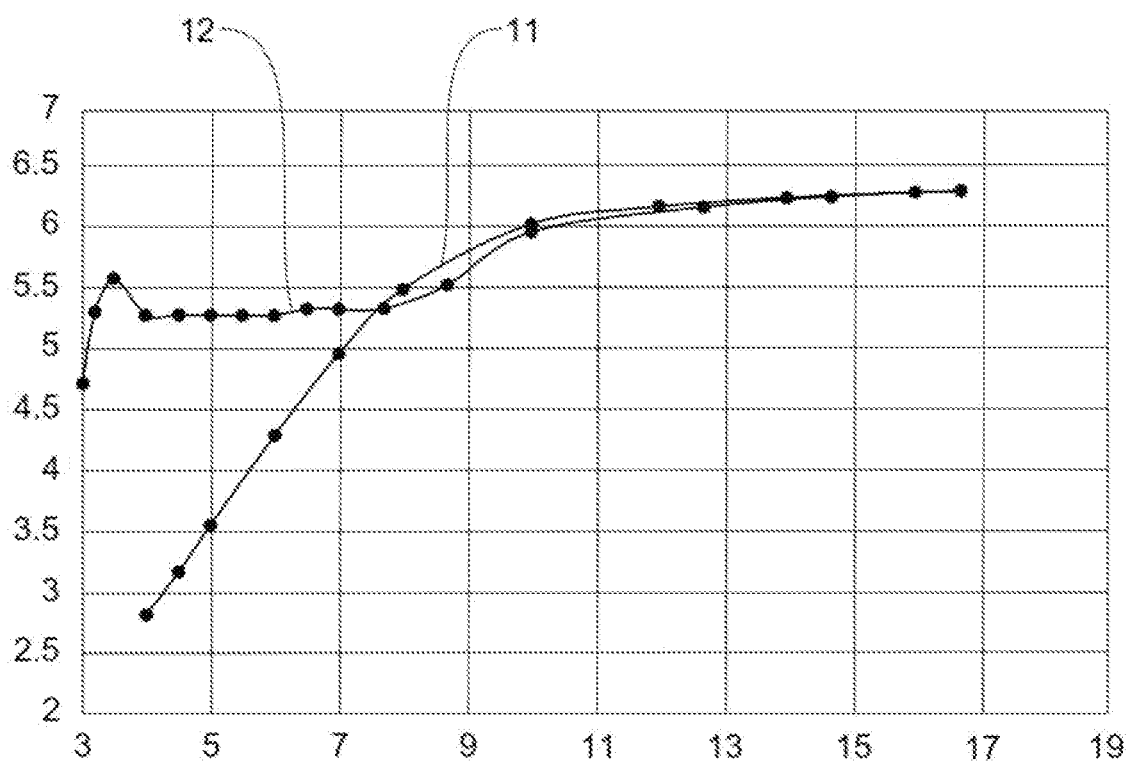

VOLTAGE CONVERTER WITH CHARGE BALANCE BETWEEN MULTIPLE OUTPUTS

CROSS REFERENCE TO RELATED APPLICATIONS

This application is the U.S. National Phase Application of PCT International Application No. PCT/EP2019/084019, filed Dec. 6, 2019, which claims priority to French Patent Application No. 1872442, filed Dec. 6, 2018, the contents of such applications being incorporated by reference herein.

FIELD OF THE INVENTION

The present invention relates in general to the field of voltage converters. It targets in particular a DC voltage converter able to supply at least one secondary voltage, including in the case of a low primary voltage.

BACKGROUND OF THE INVENTION

As illustrated in FIG. 1, it is known, in order to produce a voltage converter that receives at input a primary DC voltage 2 that is variable over a wide voltage range, such as the voltage from a battery, and that supplies at output a regulated first secondary DC voltage 3 and an unregulated second secondary DC voltage 4, to use a buck converter 5 with coupled inductors. As is known, such a buck converter 5 is able to supply at output a regulated first secondary DC voltage 3 and an unregulated second secondary DC voltage 4. The primary DC voltage 2 is advantageously filtered by a filter module F.

It is also known, in order to compensate for a drop in the primary voltage 2, in the event for example of discharging of the battery, to place a boost converter, assumed to be known, upstream of the buck converter 5 in order to support the primary voltage 2. In order to carry out its function in this configuration, ignoring the distribution of the relative charges between the first secondary voltage 3 and the second secondary voltage 4, the boost converter should be activated for a low drop in the primary voltage 2, that is to say typically for a primary voltage 2 dropping by 20 to 25% from the nominal primary voltage, corresponding to the nominal charge of the battery. For a battery with a nominal voltage of 12 V, the boost converter should be activated as soon as the primary voltage 2 drops below 9 to 10 V. This leads to frequent activations that are detrimental firstly in that activating a boost converter creates significant electromagnetic interference and secondly in that the poor efficiency of a boost converter exacerbates energy consumption on the primary voltage 2 and therefore discharging of the battery. Furthermore, for a very low primary voltage 2, if the distribution of the charges between the two secondary outputs 3, 4 is unfavorable, the boost converter alone does not make it possible to guarantee the value of the second secondary voltage 4.

SUMMARY OF THE INVENTION

An aspect of the invention aims to propose a DC voltage converter that does not have the drawbacks of the prior art, and mainly improves the quality of the second secondary voltage.

This aim is achieved by virtue of a voltage converter that receives at input a primary DC voltage that is variable over a wide voltage range and that supplies at output a regulated first secondary DC voltage and an unregulated second secondary DC voltage, comprising a buck converter with inductors coupled to two outputs, a boost converter arranged upstream of the buck converter and able to boost the primary voltage when activated, and a charge pump module able to balance the charges between the first secondary voltage and the second secondary voltage when activated, the boost converter and the charge pump module being activated simultaneously.

This solution thus makes it possible to achieve the above-mentioned aim by significantly improving performance from the prior art.

According to another feature, the boost converter, when activated, is controlled by a first controller and the charge pump module, when activated, is controlled by a second controller, the second controller being combined with the first controller.

According to another feature, the joint activation is performed when the second secondary voltage is lower than a threshold, preferably equal to a second nominal secondary voltage minus 10%.

According to another feature, the joint activation is performed when the primary voltage is lower than a threshold, preferably equal to 50% of the nominal primary voltage.

According to another feature, the buck converter is controlled by a third controller that is combined with the first controller and/or the second controller.

According to another feature, the buck converter is controlled by a third controller separate from the first controller and from the second controller.

BRIEF DESCRIPTION OF THE DRAWINGS

Other innovative advantages and features of the invention will become apparent on reading the following completely non-limiting description, which is given by way of indication, with reference to the appended drawings, in which:

FIG. 1, already described, shows a diagram according to the prior art of a converter comprising a buck converter.

FIG. 2 shows a diagram of a converter according to one preferred embodiment of the invention.

FIG. 3 shows a comparative graph of the second secondary voltage according to the prior art and according to an aspect of the invention.

For greater clarity, identical or similar elements have been designated by identical reference signs throughout the figures.

DETAILED DESCRIPTION OF THE PREFERRED EMBODIMENTS

As illustrated in FIG. 1, a DC voltage converter comprising a buck converter 5 with coupled inductors, which is assumed to be known, makes it possible, from a primary voltage 2, for example from a battery, such as a vehicle battery, having a nominal voltage of 12 V but a voltage that varies over a wide voltage range of between 3 and 42 V, to produce a first secondary DC voltage 3 and a second secondary DC voltage 4. The first secondary voltage 3 may be regulated, as is known, by a feedback loop R comprising a controller 8. This controller 8 may be of any type and operate for example in current mode, voltage mode, PWM ("pulse-width modulation") mode, hysteresis mode or any other equivalent mode. The first secondary voltage 3 is typically low in order to be able to guarantee regulation, including for a low primary voltage 2, the first secondary voltage 3 not being able to exceed the primary voltage 2. A value of 3.3 V is therefore advantageously selected. Such a value is also advantageous in that it allows power to be supplied to a vehicle computer.

The second secondary voltage 4, as produced by the buck converter 5, is derived from the first secondary voltage 3 by a gain equal to 1+N2/N1, where N2 is the turns number of the secondary winding and N1 is the turns number of the primary winding. Thus, if the turns numbers are identical N2=N1, the second secondary voltage 4 is double the first secondary voltage 3, that is to say equal to 6.6 V. However, this second secondary voltage 3, since it is not regulated, may be subjected to interference by poor inductive coupling, or by an imbalance of the charges between the first secondary output 3 and the second secondary output 4. This interference may lead to the second secondary voltage 4 collapsing, with increased sensitivity when the primary voltage 2 is low.

It is known to rectify this problem by arranging, upstream of the buck converter 5, a boost converter 6 that is responsible for supporting the primary voltage 2 and is activated when the value of the primary voltage 2 drops below a threshold. In order to provide the regulation that makes it possible to obtain the first secondary voltage 3, the boost converter 6 should be activated for a low drop in the primary voltage 2, that is to say typically for a primary voltage 2 dropping by 20 to 25% from its nominal value, that is to say, for a battery with a nominal voltage of 12 V, as soon as the primary voltage 2 drops below 9 to 10 V. This leads to frequent activations, with the double detriment explained above.

As illustrated in FIG. 2, according to one embodiment of the invention, the converter 1 substantially adopts the arrangement of the converter from the prior art. Therefore, the voltage converter 1 according to an aspect of the invention receives at input a primary DC voltage 2 that is variable over a wide voltage range. It supplies at output a regulated first secondary DC voltage 3 and an unregulated second secondary DC voltage 4. This second secondary voltage 4 therefore depends on the features of the charges, inductance ratios, inductive coupling, etc. This second secondary voltage 4 may therefore fluctuate in limit configurations. Poor inductive coupling as well as unbalanced charges between the two secondary voltages 3, 4 may cause the second secondary output 4 to collapse, all the more so when the primary voltage is low.

To perform the regulation, the converter 1 comprises a buck converter 5 with inductors coupled to two outputs. In relation to the prior art, an aspect of the invention adds a boost converter 6. The boost converter 6 is similar to the boost converter from the prior art, except with regard to the activation thereof, which is described below. The boost converter 6 is arranged upstream of the buck converter 5. It is able to boost the primary voltage 2, when activated, in order to help the buck converter 5 to supply the two secondary voltages 3, 4 and the regulation. An aspect of the invention also adds a charge pump module 7 arranged between the second secondary voltage 4 and the first secondary voltage 3 and able to balance the charges between these two outputs 3, 4 when activated. According to one feature of the invention, the boost converter 6 and the charge pump module 7 are advantageously activated simultaneously.

It may be noted that the boost converter 6, in the absence of activation, forms a passive filter similar to the filter F from the prior art.

In order to control the boost converter 6, a first controller 8, for example a switched-mode controller, is necessary, as is known. Similarly, in order to control the charge pump module 7, a second controller 8, for example a switched-mode controller, is necessary, as is known. Although they share a joint activator 9, the boost converter 6 and the charge pump module 7 could have separate controllers. However, according to one feature of the invention, the second controller and the first controller are advantageously combined. This allows significant reuse and therefore a saving on components.

This means that the addition of the charge pump module 7, if the controller 8 is not taken into account, pooled with the boost converter 6, requires only a few inexpensive and small passive components: two diodes, one resistor and one capacitor.

As may be seen in FIG. 2, the boost converter 6 and the charge pump module 7 are activated jointly by an activator 9. This activator 9 selectively copies the signal from the controller 8 received on its input "in" to its output "out" when an "enable" signal 10 is present, and does not copy it in the opposite case. The signal from the controller 8, when an "enable" signal 10 is present, is transmitted simultaneously to the boost converter 6 and to the charge pump module 7.

The "enable" signal 10 therefore makes it possible to activate or not activate the boost converter 6 and the charge pump module 7. According to one feature of the invention, the "enable" activation signal 10 results from a comparison (not shown) between the second secondary voltage 4 and a threshold. If the second secondary voltage 4, the unregulated voltage, is lower than a threshold, the activation signal 10 commands activation. If the second secondary voltage 4 is greater than the threshold, the activation signal 10 does not command activation.

The threshold is for example equal to the nominal value of the second secondary voltage minus 10%. Thus, for a battery with a nominal voltage of 12 V and for a second secondary voltage 4 with a value of 6.6 V, the threshold is advantageously equal to 6 V.

With regard to this feature, an aspect of the invention differs from the prior art in that the activation of the boost converter 6 (and of the charge pump module 7) is determined in relation to the second secondary voltage 4, whereas the prior art determines this in relation to the primary voltage 2. This is advantageous in that the driving of the activation is driven directly by the variable whose value is specified: the second secondary voltage 4.

According to another feature that is optional and an addition or an alternative to the previous one, the joint activation is performed when the primary voltage is lower than a threshold. Therefore, in this case, the activation signal 10 results from a comparison between the primary voltage 2 and a threshold. If the primary voltage 2 is lower than a threshold, the activation signal 10 commands activation. If the primary voltage 2 is greater than the threshold, the activation signal 10 does not command activation.

However, due to the particular features of the converter 1 according to an aspect of the invention, the threshold for the primary voltage, if this is used to command activation, may be far lower than in the prior art, with a value that may possibly be as low as 50% of the nominal voltage. Thus, for a battery with a nominal voltage of 12 V, the threshold may be equal to 6 V, whereas it was 9-10 V for the converter from the prior art. This advantageous feature of an aspect of the invention makes it possible to activate the boost converter 6, with the abovementioned drawbacks, only in cases that actually require this.

As is known, in order to operate a buck converter 5, a controller 8, for example a switched-mode controller, is necessary. According to one advantageous feature of an aspect of the invention, this third controller is combined with the first controller and/or with the second controller. In other words, the controller 8 used by the boost converter 6 and/or by the charge pump module 7 advantageously reuses the controller 8 already provided for the buck converter 5. This is advantageous in terms of saving on components and therefore on cost and space.

It should be noted that the buck converter 5 is permanently connected to its controller 8 and that it is not subject to the selective activation 9, which relates only to the boost converter 6 and to the charge pump module 7.

An aspect of the invention as described makes it possible to guarantee stable operation for a primary voltage 2 as low as 25% of the nominal voltage, that is to say as low as 3 V for a 12 V battery.

According to one opposing feature, the third controller is separate from the first controller and from the second controller. This option, which is more expensive and bulkier in that it uses at least two controllers, is advantageous in terms of performance. Such a configuration offers an additional margin for boosting the primary voltage 2. This configuration makes it possible to guarantee stable operation for a primary voltage 2 lower than 25% of the nominal voltage, that is to say less than 3 V for a 12 V battery.

FIG. 3 illustrates the improvement obtained by way of an aspect of the invention. On a graph containing the primary voltage 2 on the abscissa and the second secondary voltage 4 on the ordinate, it shows a first curve 11 illustrating the prior art and a second curve 12 illustrating an aspect of the invention for a highly unbalanced charge distribution between the first secondary output 3 and the second secondary output 4, that is to say the most unfavorable case. It may be noted that, for the curve 11, the second secondary voltage 4 collapses in particular when the primary voltage 2 decreases. On the contrary, according to the curve 12 and an aspect of the invention, the second secondary voltage 4 is maintained in a far improved manner when approaching low values of the primary voltage 2.

An aspect of the invention has been described above by way of example. It will be understood that a person skilled in the art will be able to produce various variant embodiments of the invention, for example by combining the various above features, which may be implemented alone or in combination, without however departing from the scope of the invention.

The invention claimed is:

1. A voltage converter that receives at input a primary DC voltage that is variable over a wide voltage range and that supplies at output a regulated first secondary DC voltage and an unregulated second secondary DC voltage, comprising:
   a buck converter with inductors coupled to two outputs,
   a boost converter arranged upstream of the buck converter and able to boost the primary voltage when activated, and
   a charge pump module arranged between the second secondary voltage and the first secondary voltage and able to balance charges when activated, the boost converter and the charge pump module being activated simultaneously.

2. The converter as claimed in claim 1, wherein the boost converter, when activated, is controlled by a first controller and the charge pump module, when activated, is controlled by a second controller, the second controller being combined with the first controller.

3. The converter as claimed in claim 2, wherein the buck converter is controlled by a third controller that is combined with the first controller and/or the second controller.

4. The converter as claimed in claim 2, wherein the buck converter is controlled by a third controller separate from the first controller and from the second controller.

5. The converter as claimed in claim 1, wherein the simultaneous activation is performed when the second secondary voltage is lower than a threshold.

6. The converter as claimed in claim 5, wherein the threshold is equal to a second nominal secondary voltage minus 10%.

7. The converter as claimed in claim 1, wherein the simultaneous activation is performed when the primary voltage is lower than a threshold.

8. The converter as claimed in claim 7, wherein the threshold is equal to 50% of a nominal primary voltage.

\* \* \* \* \*